United States Patent [19]
Takahashi et al.

[11] Patent Number: 5,293,239
[45] Date of Patent: Mar. 8, 1994

[54] CAMERA APPARATUS

[75] Inventors: Koji Takahashi; Teruo Hieda, both of Kanagawa, Japan

[73] Assignee: Canon Kabushiki Kaisha, Tokyo, Japan

[21] Appl. No.: 602,918

[22] Filed: Oct. 23, 1990

Related U.S. Application Data

[63] Continuation of Ser. No. 325,544, Mar. 20, 1989, abandoned.

[30] Foreign Application Priority Data

Mar. 30, 1988 [JP] Japan ................. 63-077334

[51] Int. Cl.$^5$ .................. H04N 3/14; H04N 5/335
[52] U.S. Cl. ............................................ 348/241
[58] Field of Search .............. 358/213.16, 213.19, 358/213.15, 213.26, 213.27, 163, 160, 167, 213.18

[56] References Cited

U.S. PATENT DOCUMENTS

| | | | |
|---|---|---|---|
| 3,629,499 | 12/1971 | Carlson | 358/167 |
| 3,728,481 | 4/1973 | Froehlich | 358/163 |
| 3,949,162 | 4/1976 | Malveg | 358/167 |
| 4,079,423 | 3/1978 | Diehl | 358/213.18 |
| 4,496,982 | 1/1985 | Levine | 358/213.16 |
| 4,498,105 | 2/1985 | Crawshaw | 358/213.16 |
| 4,525,743 | 6/1985 | Wood, Jr. | 358/213.16 |
| 4,562,473 | 12/1985 | Levine | 358/213.16 |
| 4,739,409 | 4/1988 | Baumeister | 358/213.16 |
| 4,807,034 | 2/1989 | Takeuchi et al. | 358/167 |
| 4,839,729 | 6/1989 | Ando | 358/213.16 |
| 4,841,366 | 6/1989 | Katagiri et al. | 358/167 |

*Primary Examiner*—Richard E. Chilcot, Jr.
*Assistant Examiner*—Kinfe-Michael Negash
*Attorney, Agent, or Firm*—Robin, Blecker, Daley & Driscoll

[57] ABSTRACT

A camera apparatus has an image sensing part arranged to successively output for every field or frame a first image signal obtained for a predetermined exposure period of time and a second image signal obtained for a very short exposure period of time, a noise extracting circuit arranged to extract a fixed pattern noise from the second image signal, and a subtraction circuit arranged to subtract, under a predetermined weighting condition, the fixed pattern noise extracted by the noise extracting circuit first image signal. Another camera apparatus has an image sensing part capable of adjusting an exposure period of time, a control circuit arranged to change the exposure period of time of the image sensing part to a high shutter-speed photography at intervals of a predetermined number of taken pictures, an interpolation circuit arranged to interpolate an image signal obtained by the high shutter-speed photography by using an image signal obtained for a predetermined exposure period of time, a noise extracting circuit arranged to extract a fixed pattern noise from the image signal obtained by the high shutter-speed photography, and a subtraction circuit arranged to subtract, under a predetermined weighting condition, the fixed pattern noise extracted by the noise extracting circuit from the image signal obtained for the predetermined exposure period of time by the image sensing part or from an interpolated image signal obtained by the interpolation circuit.

53 Claims, 6 Drawing Sheets

CAMERA APPARATUS

This application is a continuation of application Ser. No. 325,544, filed Mar. 20, 1989 now abandoned.

BACKGROUND OF THE INVENTION

1. Field of the Invention

This invention relates to a camera apparatus such as a video camera which produces an image signal and more particularly to a camera apparatus which produces an image signal from which a fixed pattern noise has been removed.

2. Description of the Related Art

It is considered important for a video camera, particularly a high-sensitivity camera of the kind to be used under a low degree of illumination, to remove from the image signal an intrinsic noise of the image sensing part of the camera (hereinafter referred to as a fixed pattern noise) as much as possible. An apparatus developed to meet this requirement has been disclosed in an article entitled "High-Sensitivity Camera and Image Processing Technique" which appeared in "NHK Technical Research Monthly Report," Oct., 1986, Vol. 29, p 375–378. The arrangement of this known apparatus is as described below with reference to FIG. 1 of the accompanying drawings:

Referring to FIG. 1, the light of an object to be photographed comes through an optical system 10 to fall on the imaging plane of an image sensing part 12 and is photo-electric converted there. The photo-electric conversion output of the image sensing part 12 is supplied to a camera signal processing circuit 14. The circuit 14 performs a known signal processing operation to convert it into a known image signal form of NTSC, PAL or the like. The output of the camera signal processing circuit 14 is supplied to one of the input terminals of a subtracter 16 and also to an image memory 20 via a normally open switch 18. The switch 18 operates in association with a shield plate 22 disposed in front of the optical system 10. While the incidence of the light of a photographing field on the optical system 10 is blocked by the shield plate 22, the switch 14 is closed to allow the output of the camera signal processing circuit 14 to be stored in the image memory 20. This allows the image memory 20 to store a fixed pattern noise including the intrinsic noises of the image sensing part 12 and the ensuing circuit system. This fixed pattern noise is taken into the image memory 20 either at the start of a photographing operation or during a pause thereof.

The image memory 20 is arranged to output the stored signal in synchronism with the image signal outputting action of the camera signal processing circuit 14. A multiplier 24 is arranged to multiply the output of the image memory 20 by a suitable constant k. The output of the multiplier 24 is supplied to the other input terminal of the subtracter 16. The subtracter 16 subtracts the output (a fixed pattern noise component) of the multiplier 24 from the output of the camera signal processing circuit 14. This arrangement gives an image signal with the fixed pattern noise reduced to a sufficiently low level.

In the case of a solid-state image sensor, the fixed pattern noise is considered to result mainly from the following causes: (i) uneven sensitivity due to uneven light receiving areas of picture elements; (ii) a thermal noise dependent upon the ambient temperature; and (iii) uneven amplification rates of amplifiers in a case where different amplifiers are provided for different picture elements. While the noise resulting from the causes (i) and (ii) remains unchanged from its initial state, the thermal noise (iii) changes any time during the process of a photographing operation.

The thermal noise greatly affects visual sensation. Therefore, with a fixed pattern noise initially taken in by the image memory 20 at the beginning of photographing, if the above-stated subtracting operation is carried on by using the initial noise value over a long period of time, the noise component of the output image signal would gradually increase.

To avoid this, the noise value stored in the image memory 20 must be renewed taking the fixed pattern noise again into the memory 20 by giving pause to the photographing operation before completion thereof. The renewal work is not only troublesome but also makes a long photographing operation impossible. Besides, the method of doing the renewal work is hardly a fundamental solution of the problem because the noise component of the output image signal gradually increases before the renewal work.

SUMMARY OF THE INVENTION

It is therefore an object of this invention to provide a camera apparatus which is arranged to effectively remove the above-stated fixed pattern noise.

To attain this object, a camera apparatus which is arranged according to this invention as a first embodiment thereof comprises: image sensing means for successively outputting, for every field or frame, a first image signal obtained for a predetermined exposure period of time and a second image signal obtained for a very short exposure period of time; noise extracting means for extracting a fixed pattern noise from the second image signal; and subtracting means for subtracting the fixed pattern noise extracted by the noise extracting means from the first image signal under a predetermined weighting condition.

Further, a camera apparatus which is arranged according to the invention as a second embodiment thereof comprises: image sensing means capable of adjusting an exposure period of time; control means for changing the exposure period of time of the image sensing means to a high shutter-speed photography at intervals of a predetermined number of taken pictures; interpolating means for interpolating an image signal obtained by the high shutter-speed photography by using an image signal obtained for a predetermined exposure period of time; noise extracting means for extracting a fixed pattern noise from the image signal obtained by the high shutter-speed photography; and subtracting means for subtracting, under a predetermined weighting condition, the fixed pattern noise extracted by the noise extracting means from the image signal obtained for the predetermined exposure period of time by the image sensing means or from an interpolated signal obtained by the interpolating means.

With the embodiment arranged in the above-stated manner, the image signal which is periodically obtained at a short exposure period of time by the image sensing means enables the noise extracting means to renew the momentarily changing fixed pattern noise. Then, the subtracting means subtracts the renewed fixed pattern noise from the image signal obtained for the predetermined period of exposure time. The arrangement thus prevents a noise of the image signal from gradually increasing during the process of photographing. The embodiment thus obviates the necessity of giving pause to a photographing operation for renewal of the fixed pattern noise like in the case of the prior art example described in the foregoing.

The above and other objects and features of the invention will become apparent from the following detailed description of embodiments thereof taken in connection with the accompanying drawings.

DESCRIPTION OF THE PREFERRED EMBODIMENTS

Figure 1:
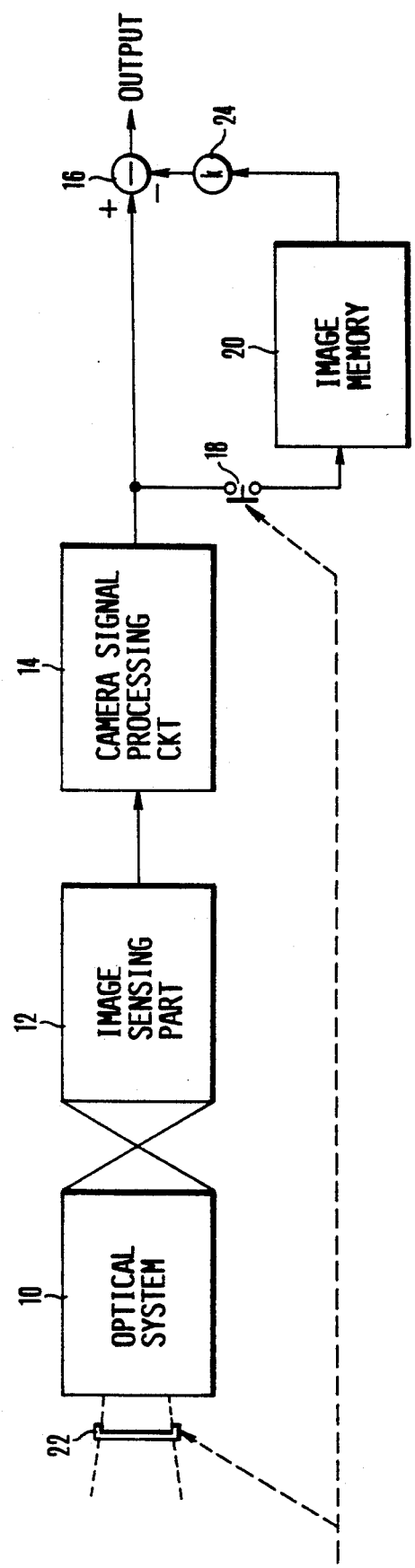
FIG. 1 is a block diagram showing the arrangement of the conventional camera apparatus.
Figure 2:
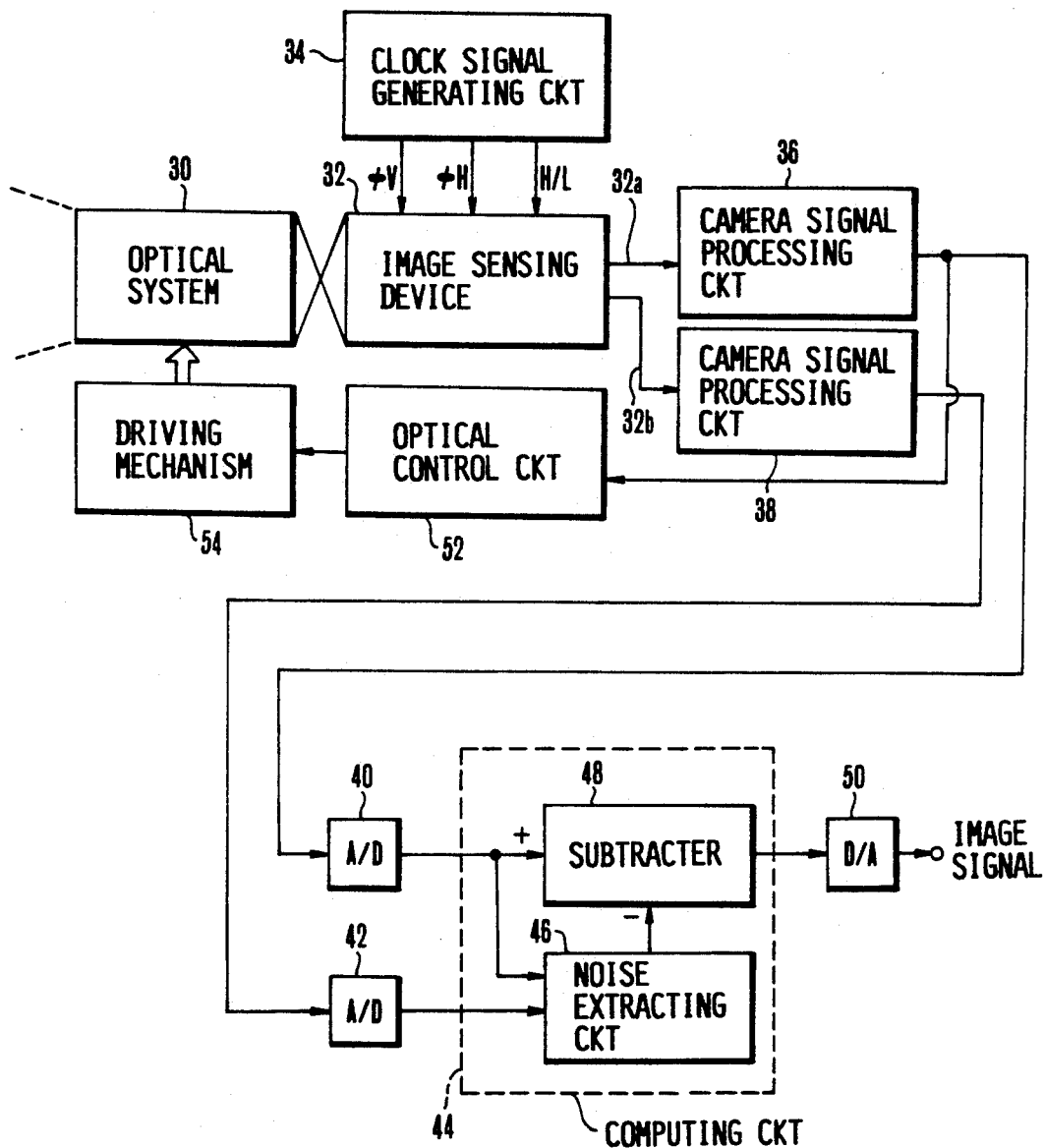
FIG. 2 is a block diagram showing the arrangement of an embodiment of this invention.

An embodiment of this invention is described below with reference to the accompanying drawings:

FIG. 2 shows in a block diagram the arrangement of the embodiment. A photo-taking optical system 30 which is arranged in an ordinary manner is provided with an iris. An image sensing device 32 is arranged to simultaneously output two signals from its output ports. One of them is an ordinary photo-electric conversion signal 32a obtained for an electric charge storing period of time of, for example, about 1/60 sec.. The other is a photo-electric conversion signal 32b obtained for a very short electric charge storing period of time of, for example, only about 1/2,000 sec.. A clock signal generating circuit 34 is arranged to control the image sensing device 32 by means of vertical and horizontal synchronizing signals $\phi V$ and $\phi H$ and a shutter-speed control signal H/L.

Figure 3:
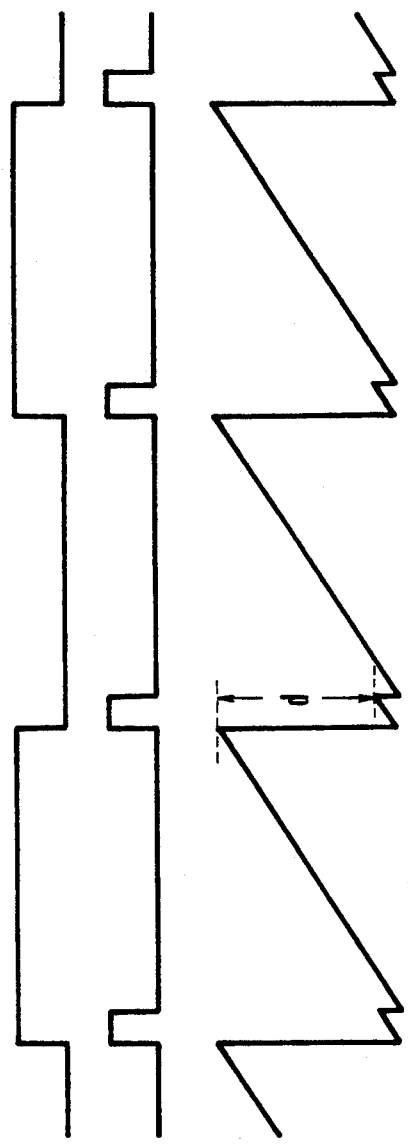
FIGS. 3(a), 3(b) and 3(c) show in a timing chart the operation of an image sensing device 32 of FIG. 2.

More specifically, the image sensing device 32 performs a high shutter-speed (short time storing) photography when the shutter-speed control signal H/L is at a high level, and a normal shutter-speed (storing for about one field period) photography when at a low level. The details of this relation are shown in FIGS. 3(a), 3(b) and 3(c). FIG. 3(a) shows a control pulse signal Fv which is produced at one frame period and is, for example, of a rectangular wave form of 30 Hz in the case of the NTSC system. FIG. 3(b) shows a shutter-speed control signal H/L which is at a high level for a given short period of time at every edge of the rise and fall of the control pulse signal Fv. Assuming that a constant quantity of incident light is continuously obtained on the image sensing device 32, FIG. 3(c) visually shows the manner in which the light is stored. With the high level period of the shutter-speed control signal of FIG. 3(b) assumed to be 1/2,000 sec. and the low level period of it to be 1/60 sec., a distance "d" shown in FIG. 3(c) corresponds to −30 dB or thereabout.

Camera signal processing circuits 36 and 38 are respectively arranged to perform known signal processing operations on the ordinary signal 32a and the high-speed photography signal 32b which are simultaneously output from the image sensing device 32. As a result, these signals are output in the NTSC, PAL, Y-I-Q or R-G-B signal form or the like. In other words, the two camera signal processing circuits 36 and 38 are arranged and operate in exactly the same manner. The outputs of the camera signal processing circuits 36 and 38 are supplied to A/D converters 40 and 42 to be converted into digital signals, respectively. These digital signals are supplied to a computing circuit 44. The computing circuit 44 includes a fixed pattern noise extracting circuit 46 which is arranged to extract a fixed pattern noise from the output of the A/D converter 42 (i.e. the image signal obtained in the high shutter-speed photography by the image sensing device 32), and a subtracter 48 which is arranged to subtract the fixed pattern noise extracted by the fixed pattern noise extracting circuit 46 for every field from the output of the A/D converter 40 (i.e. the image signal obtained in the normal shutter-speed photography by the image sensing device 32).

The computing circuit 44 thus outputs from the subtracter 48 a digital image signal from which the fixed pattern noise has been removed for every field. The output of the computing circuit 44 is converted into an analog signal by a D/A converter 50.

Further, the output of the camera signal processing circuit 36 (the image signal obtained in the normal shutter-speed photography) is supplied also to an optical control circuit 52 which performs automatic exposure adjustment and automatic focus adjustment. The optical control circuit 52 is arranged to control the focusing lens and the iris of an optical system 30 through a driving mechanism 54 in accordance with a known control method.

Figure 4:
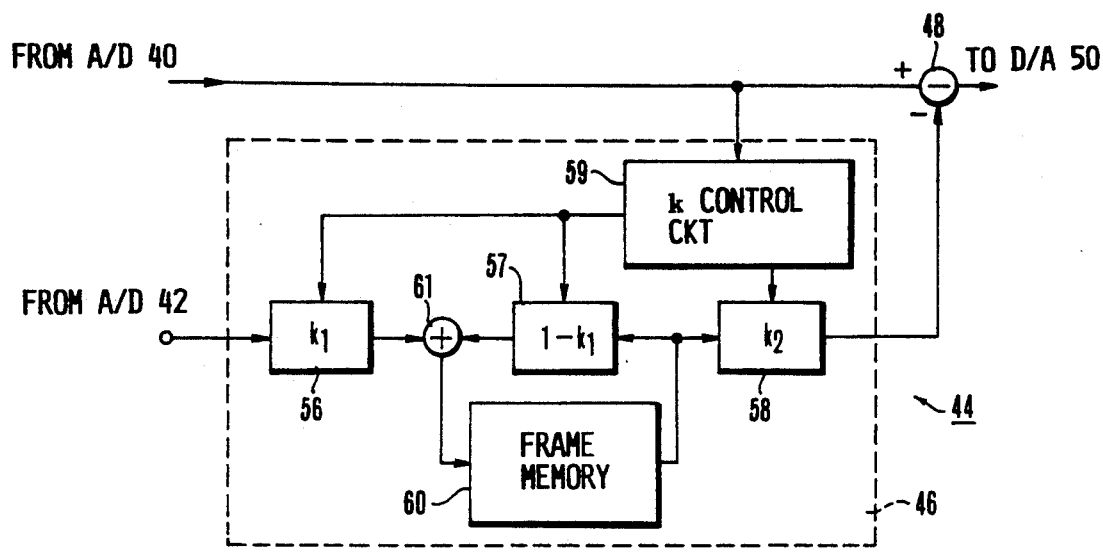
FIG. 4 is a block diagram showing the details of a computing circuit 14 of FIG. 2.

FIG. 4 shows the details of the computing circuit 44. The fixed pattern noise extracting circuit 46 comprises a multiplier 56 using a coefficient k1, a multiplier 57 using a coefficient 1−k1, another multiplier 58 using a coefficient k2; a k control circuit 59 which is arranged to adjust the coefficients k1, 1−k1 and k2 of the multipliers 56, 57 and 58 according to the output (particularly the luminance signal included in the output) of the A/D converter 40 (i.e. the image signal obtained in the normal shutter-speed photography), a frame memory 60, and an adder 61. The digital image signal which has been obtained by a short time storing process at the image sensing device 32 and which has been output from the A/D converter 42 is supplied to the multiplier 56 to be multiplied by the coefficient k1 and is then supplied to the adder 61. The frame memory 60 is arranged to delay the output of the adder 61 for a period of time corresponding to one picture (for the period of one field or one frame, or for 1/60 sec. or 1/30 sec. in the case of the NTSC system). The digital image signal which has been thus delayed by the frame memory 60 is supplied to the multiplier 57 to be multiplied by the coefficient 1−k1. The multiplied output is then supplied to the adder 61. By this process, an image signal of the current picture and an image signal of the preceding picture are added together in the ratio defined by the coefficient k1 in a cyclic manner. Through that cyclic process, a fixed pattern noise component which has a high degree of timewise correlativity (field correlation or frame correlation) is extracted and stored by the frame memory 60.

The output of the memory 60 is further multiplied by the multiplier 58 by the coefficient k2 for the purpose of adjusting the level of the fixed pattern noise. The output of the multiplier 58 is supplied to the subtracter 48. With the multiplier 58 provided for adjustment of the level of the fixed pattern noise, the coefficient k2 is set at such a value that the output of the subtracter 48 includes the fixed pattern noise at its minimal value. While the coefficient k2 is arranged to be automatically adjusted by the k control circuit 58, the coefficient k2 may be arranged to be manually adjustable.

Figure 5:
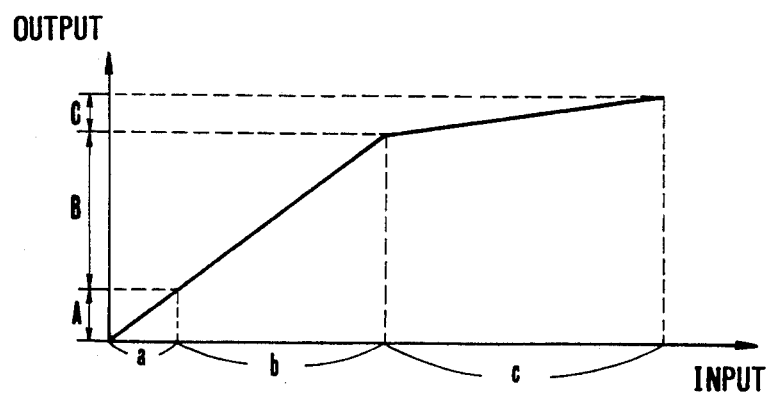
FIG. 5 shows the output voltage characteristic of the image sensing device 32 in relation to the quantity of light incident thereon.

FIG. 5 shows the output voltage of the image sensing device 32 of FIG. 2 in relation to the quantity of light incident on the image sensing device 32. In FIG. 5, the axis of abscissa shows the quantity of incident light while the axis of ordinate shows the output voltage. A reference symbol "a" denotes an area having the incident light in a small quantity, "b" denotes an area having the incident light in an adequate quantity and "c" denotes an area having a high degree of luminance. The output voltage is divided also into regions A, B and C which correspond to these incident light receiving areas. A dark current noise and its effect on visual sensation vary with the quantity of the incident light. Further, the amount to be subtracted by the subtracter 48 also varies according to the gamma characteristic of the image sensing device 32. Therefore, the k control circuit 59 is arranged to adjust the coefficients k1 and k2 for every picture according to the region A, B or C of the output voltage obtained.

Figure 6:
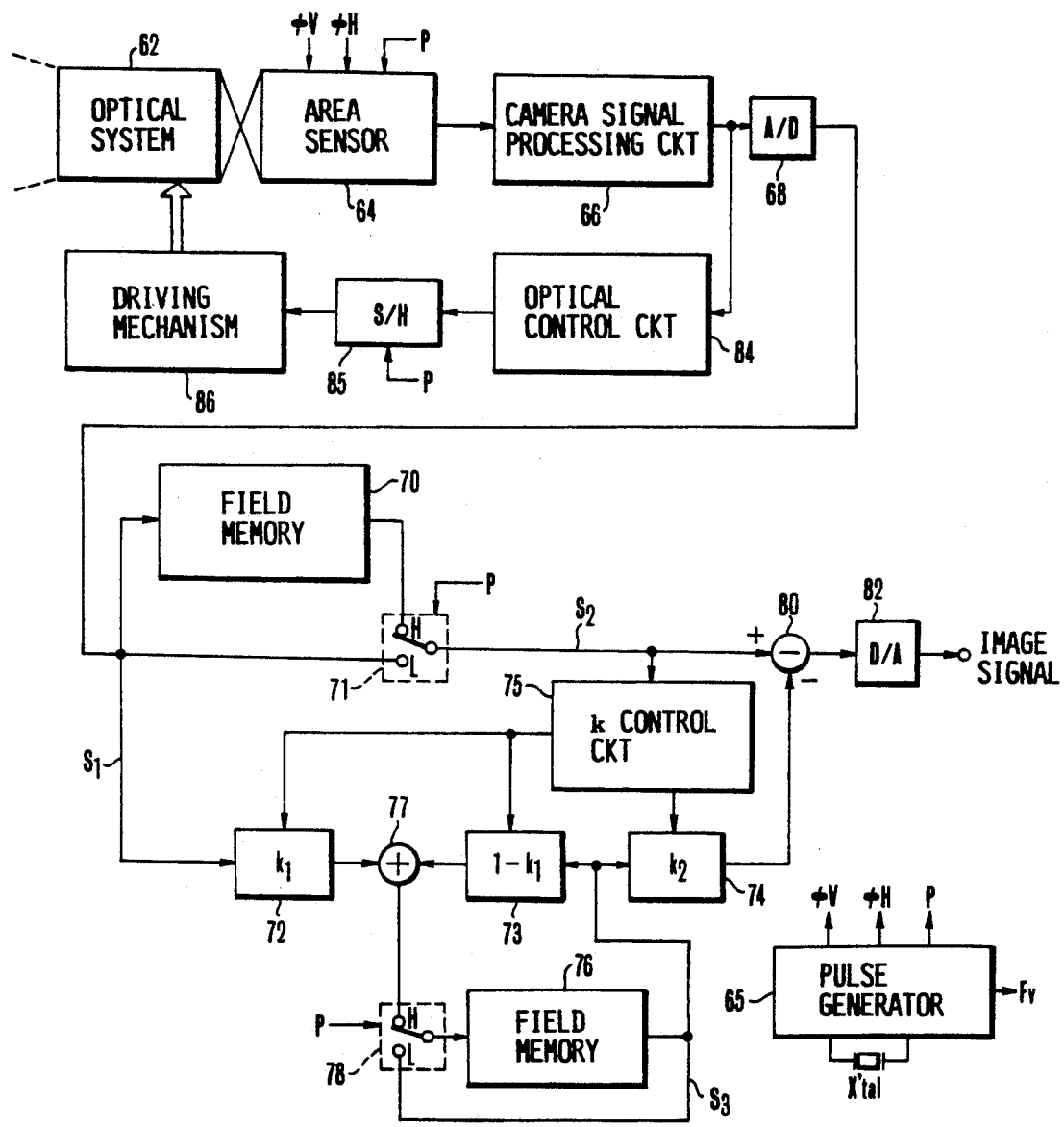
FIG. 6 is a block diagram showing the arrangement of another embodiment of the invention.
Figure 7:
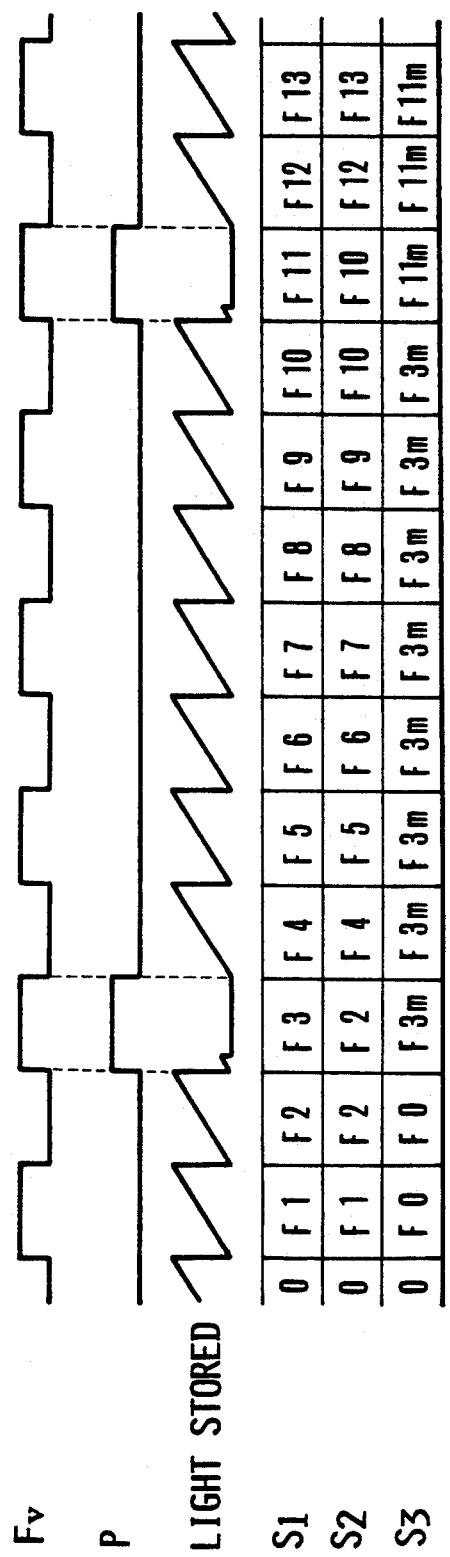
FIG. 7 is a timing chart showing the operation of the embodiment shown in FIG. 6.

FIG. 6 shows in a block diagram the arrangement of another embodiment of the invention. FIG. 7 shows in a timing chart the operation of the embodiment. In this case, an area sensor such as a CCD is employed. A fixed pattern noise is obtained and taken into a memory by carrying out a high shutter-speed photography just for one picture at regular intervals of several fields to scores of fields. Incidentally, in this embodiment, a high shutter-speed photography may be taken while a recording operation is in pause. An advantage of this embodiment resides in that the camera signal processing circuit and the A/D converter can be arranged only in one channel.

Referring to FIG. 6, a photo-taking optical system 62, an area sensor 64, a camera signal processing circuit 66 and an A/D converter 68 are arranged to have the area sensor 64 output an image signal for one picture obtained in the the high shutter-speed photography at regular intervals of several to scores of fields as mentioned above. With the exception of that point, they operate in the same manner as the elements 30, 32, 36 and 40 shown in FIG. 2. A pulse generator 65 is arranged to supply to the area sensor 64 a vertical synchronizing signal $\phi V$, a horizontal synchronizing signal $\phi H$ and a control signal P as shutter-speed change-over signals. The level of the control signal P becomes high only in selecting the high shutter-speed photography and normally remains low. In FIG. 7, the control signal P is shown, for the sake of illustration, as arranged to be at a high level for selection of the high shutter-speed photography once for every eight fields.

The image signal is not obtained with an adequate exposure for a field for which the area sensor 64 performs the high shutter-speed photography. For that field, therefore, the inadequate image signal is substituted by the image signal of the preceding field by shifting the position of a switch 71 with the control signal P for reading out the substitute image signal from a field memory 70 which is arranged to store the output of the A/D converter 68 for each field one after another.

Multipliers 72, 73 and 74, a k control circuit 75, a field memory 76 and an adder 77 are arranged to give the same advantageous effect as the fixed pattern noise extracting circuit 46 of FIG. 4. In the case of FIG. 6, however, a switch 78 is interposed in between the output terminal of the adder 77 and the memory 76. The switch 78 is arranged to allow the output of the adder 77 to be supplied to the memory 76 only at the time of the high shutter-speed photography. Except that occasion, the output of the memory 76 is fed back to the memory 76 as it is.

The details of the operation of the fixed pattern noise extracting part are as follows: The area sensor 64 performs the high shutter-speed photography for a period during which the control signal P is at a high level. During this period, the sensor 64 stores light only for a short period of time and the electric charge of each photo-electric conversion cell is read out over a period of time corresponding to one field. Meanwhile, the position of the switch 78 has been shifted toward the adder 77 for allowing the memory 76 to take in a signal obtained by the short time light storing action mentioned above. In taking the above-stated signal into the memory 76, the mixing ratio is determined by the coefficient k1 in the same manner as in the case of FIG. 4. A fixed pattern noise component is extracted and stored by the memory 76 accordingly as the cyclic process is performed by the multipliers 72 and 73, the adder 77 and the field memory 76.

Referring to FIG. 7, a signal S1 output from the A/D converter 68 for each field is assumed to be expressed, for example, as F0, F1, F2, F3,—, F10, F11, F12,—and the signal which is taken in by the memory 76 to be expressed by adding a suffix "m" to the above-stated symbols as applicable. In a case where the field of the signal S1 is F3 when the control signal P is at a high level, the signal taken in by the memory 76 is F3m (=k1 F3+(1−K1) F0). This signal F3m is then cyclically stored by the memory 76 until the level of the control signal P becomes high next time. In FIG. 7, a signal S3 represents the output of the memory 76. When the level of the control signal P becomes high next time, the signal taken in by the memory 76 becomes F11m (=K1 F11 +(1−K1) F3m).

A subtracter 80 is arranged, like the subtracter 48 of FIG. 2, to subtract the fixed pattern noise component from an image signal S2 which is obtained by the normal shutter-speed photography and processed either through the A/D converter 68 or interpolated by the field memory 70. The output of the subtracter 80 is supplied to a D/A converter 82 to be converted into an analog signal.

An optical control circuit 84 and a driving mechanism 86 are arranged to perform automatic focus adjustment and automatic exposure adjustment like in the case of the optical control circuit 52 and the driving mechanism 54 of FIG. 2. In the case of this embodiment, however, the output of the camera signal processing circuit 64 is not usable for optical control when the control signal P is at a high level. In that instance, therefore, the output of the optical control circuit 84 is supplied by means of the control signal P to a sample-and-hold (S/H) circuit 85 to have it sampled and held. More specifically, the S/H circuit 85 is arranged to sample and hold the output of the circuit 84 at a point of time when the level of the control signal P changes to a high level and to allow it to be output as it is when the level of the control signal P is at a low level.

In the case of the embodiment shown in FIG. 6, the image signal becomes a field interpolated signal at the time of the high shutter-speed photography. However, with the high shutter-speed photography arranged to be repeated only at intervals of such a long period of time corresponding to at least five pictures, it presents no problem in an actual operation.

As apparent from the foregoing description, in accordance with the invention, the fixed pattern noise which tends to vary timewise every moment is arranged to be recurrently detected and removed. Therefore, the noise can be prevented from increasing due to the long continuation of a photographing operation. Further, the invention obviates the inconvenience of putting pause to photographing operation for obtaining information on the fixed pattern noise.

What is claimed is:

1. A camera apparatus comprising:
   a) image sensing means for successively outputting a first image signal obtained for a first exposure period of time and a second image signal obtained for a second exposure period of time which is shorter than said first exposure period of time;
   b) noise extracting means for extracting a fixed pattern noise from a plurality of second image signals;
   c) computing means for performing a computing operation on said first image signal and said fixed pattern noise extracted by said noise extracting means; and
   d) an exposure control means for setting said first exposure period of time and said second exposure period of time in the image sensing means.

2. An apparatus according to claim 1, wherein said second exposure period of time is equal to or shorter than a vertical blanking period.

3. An apparatus according to claim 1, wherein said image sensing means is arranged to alternately output said first image signal and said second image signal.

4. An apparatus according to claim 1, wherein said image sensing means is arranged to intermittently form said second image signal at predetermined intervals.

5. An apparatus according to claim 1, wherein said computing means includes subtracting means.

6. An apparatus according to claim 1, wherein said computing means includes weight attaching means for attaching a predetermined degree of weight to said fixed pattern noise extracted by said noise extracting means.

7. An apparatus according to claim 3, wherein said first and second image signals are respectively of a length corresponding to one field or one frame.

8. An apparatus according to claim, wherein said first exposure period of time is about one field period.

9. A camera apparatus comprising:
   a) image sensing means capable of adjusting an exposure period of time;
   b) control means for changing the exposure period of time of said image sensing means to one of a first exposure period of time and a second exposure period of time;
   c) interpolating means for interpolating an image signal obtained for said second exposure period of time by using an image signal obtained for said first exposure period of time;
   d) noise extracting means for extracting a fixed pattern noise from the image signal obtained for said second exposure period of time by said image sensing means; and
   e) computing means for computing the image signal obtained for said first exposure period of time by said image sensing means or an interpolated image signal output from said interpolating means with said fixed pattern noise extracted by said noise extracting means.

10. An apparatus according to claim 9, wherein said second exposure period of time is equal to or shorter than a vertical blanking period.

11. An apparatus according to claim 9, wherein said image sensing means is arranged to alternately output said first image signal said and second image signal.

12. An apparatus according to claim 11, wherein said first and second image signals are respectively of a length corresponding to one field or one frame.

13. An apparatus according to claim 9, wherein said computing means includes subtracting means.

14. An apparatus according to claim 9, wherein said computing means includes weight attaching means for attaching a predetermined degree of weight to said fixed pattern noise extracted by said noise extracting means.

15. An apparatus according to claim 9, wherein said first exposure period of time is about one field period.

16. An apparatus according to claim 1 or 9, wherein said first exposure period of time and said second exposure period of time are obtained by controlling a charge storing period of time in said image sensing means.

17. A camera apparatus according to claim 1, wherein said exposure control means includes an electronic shutter.

18. A camera apparatus, comprising:
   a) image sensing means;
   b) means for obtaining first and second image signals by at least two time exposures of the image sensing means; and
   c) means for removing a fixed pattern noise extracted from the image signals by computing the image signals obtained from a plurality of one of the exposures, out of the image signal obtained by the other exposure.

19. A camera apparatus according to claim 18, wherein the period of time of said one exposure is shorter than that of the other exposure.

20. An apparatus according to claim 18, wherein the period of time necessary for said one of exposures is substantially equal to or shorter than a vertical blanking period.

21. An apparatus according to claim 18, wherein said image sensing means is arranged to intermittently form said second image signal at predetermined intervals.

22. An apparatus according to claim 18, wherein said image sensing means is arranged to alternately output said first image signal and said second image signal.

23. An apparatus according to claim 22, wherein said first and second image signals are respectively of a length corresponding to one field or one frame.

24. An apparatus according to claim 18, wherein said exposure period of time necessary for the other exposure is about one field period.

25. A camera apparatus according to claim 1, wherein the plurality of second image signals are obtained, respectively, by a plurality of second exposures.

26. An apparatus according to claim 1, wherein said first exposure period and said second exposure period exist one time, respectively, in every field period.

27. An apparatus according to claim 1, wherein said noise extracting means includes an adder and a memory circuit for memorizing an output of said adder, said adder being arranged to add an output of the memory circuit and said second image signals on receipt thereof by said adder.

28. An apparatus according to claim 27, wherein said output of said memory circuit and said second image signal are subjected to predetermined weightings, respectively, and added together.

29. An apparatus according to claim 28, wherein weights of said weightings are set according to said first image signals.

30. A camera apparatus comprising:
   a) image sensing means for successively outputting a first image signal obtained for a first exposure period of time and a second image signal obtained for a second exposure period of time which is shorter than said first exposure period of time;
   b) noise extracting means for extracting a fixed noise pattern on the basis of correlations between a plurality of said second image signals; and
   c) computing means for performing a computing operation on said first image signal and said fixed pattern noise extracted by said noise extracting means.

31. A camera apparatus according to claim 30, wherein the plurality of second image signals are obtained, respectively, by a plurality of second exposures.

32. An apparatus according to claim 30, wherein said first exposure period and said second exposure period exist one time respectively, in every field period.

33. An apparatus according to claim 30, wherein said noise extracting means includes an adder and a memory circuit for memorizing an output of said adder, said adder being arranged to add an output of the memory circuit and said second image signal upon receipt thereof by said adder.

34. An apparatus according to claim 30, wherein said computing means includes weighting means for weighting a predetermined weight to said fixed pattern noise extracted by said noise extracting means.

35. An apparatus according to claim 33, wherein said output of said memory circuit and said second image signal are subjected to predetermined weightings, respectively, and added together.

36. An apparatus according to claim 35, wherein the weights of said weightings are set, according to said first image signal.

37. An apparatus according to claim 30, wherein said second exposure period of time is equal to or shorter than a vertical blanking period.

38. An apparatus according to claim 30, wherein said image sensing means is arranged to alternately output said first image signal said and second image signal.

39. An apparatus according to claim 30, wherein said image sensing means is arranged to intermittently form said second image signal at predetermined intervals.

40. An apparatus according to claim 30, wherein said computing means includes subtracting means.

41. An apparatus according to claim 30, wherein said first and second image signals are respectively of a length corresponding to one field of one frame.

42. An apparatus according to claim 30, wherein said first exposure period of time is about one field period.

43. A camera apparatus, comprising:
   1) noise extracting means for extracting a fixed pattern noise, on the basis of correlations between image signals read out from a signal image sensing means, with predetermined time differences, said noise extracting means including an adder and a memory circuit for memorizing an output of said adder, said adder being arranged to add an output of the memory circuit and a first image signal upon receipt thereof by said adder, said noise extracting means including means for subjecting said output of said memory circuit and a second image signal to predetermined weightings and adding the weighted signals; and
   b) noise removing means for removing the fixed pattern noise extracted by said noise extracting means from an image signal read out from said image sensing means.

44. A camera apparatus comprising:
   a) image sensing means for successively outputting a first image signal obtained for a first exposure period of time and a second image signal obtained for a second exposure period of time, said second exposure period of time being shorter than said first exposure period of time;
   b) noise removing means for removing a noise component detected on the basis of correlations between a plurality of image signals with said first image signal, said noise removing means including an adder and a memory circuit for memorizing an output of said adder, said adder being arranged to add an output of the memory circuit and said second image signal upon receipt thereof by said adder; and
   c) driving means for controlling signal reading out or outputting operation of said image sensing means.

45. An apparatus according to claim 44, wherein the noise removing means includes noise extracting means and computing means for removing the extracted noise from an image signal.

46. An apparatus according to claim 45, wherein said computing means includes subtracting means.

47. An apparatus according to claim 44, wherein said output of said memory circuit and said second image signal are subjected to predetermined weightings, respectively, and added together.

48. An apparatus according to claim 47, wherein the weights of said weightings are set, according to said first image signal.

49. An apparatus according to claim 44, wherein said second period of time is equal to or shorter than a vertical blanking period.

50. An apparatus according to claim 49, wherein said image sensing means is arranged to alternately output said first image signal and said second image signal.

51. An apparatus according to claim 49, wherein said image sensing means is arranged to intermittently form said second image signal at predetermined intervals.

52. An apparatus according to claim 49, wherein said first and second image signals are respectively of a length corresponding to one field or one frame.

53. An apparatus according to claim 44, wherein said first exposure period of time is about one field period.

* * * * *

UNITED STATES PATENT AND TRADEMARK OFFICE
CERTIFICATE OF CORRECTION

PATENT NO.   : 5,293,239
DATED        : March 8, 1994
INVENTOR(S)  : Koji Takahashi et al.

It is certified that error appears in the above-indentified patent and that said Letters Patent is hereby corrected as shown below:

Abstract, line 10, after "circuit" insert -- from the --.

Col. 7, line 52, change "claim" to -- claim 1 --.

Col. 10, line 59, change "claim 49" to -- claim 44 --.

Signed and Sealed this

Thirtieth Day of August, 1994

Attest:

Attesting Officer

BRUCE LEHMAN

Commissioner of Patents and Trademarks